June 12, 1962    G. L. THORBURN    3,038,688
LIQUID CONTAINER TYPE CHRISTMAS TREE STAND
Filed Dec. 4, 1959
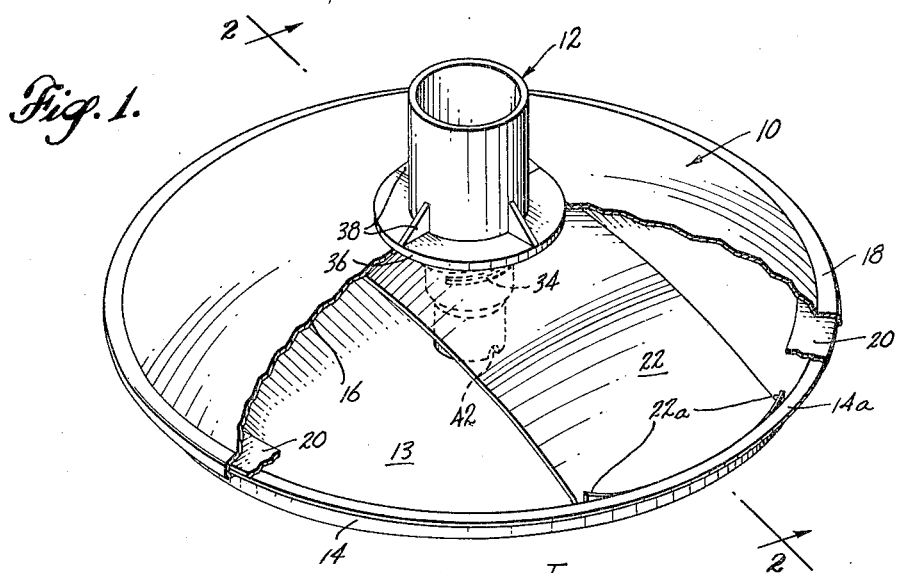
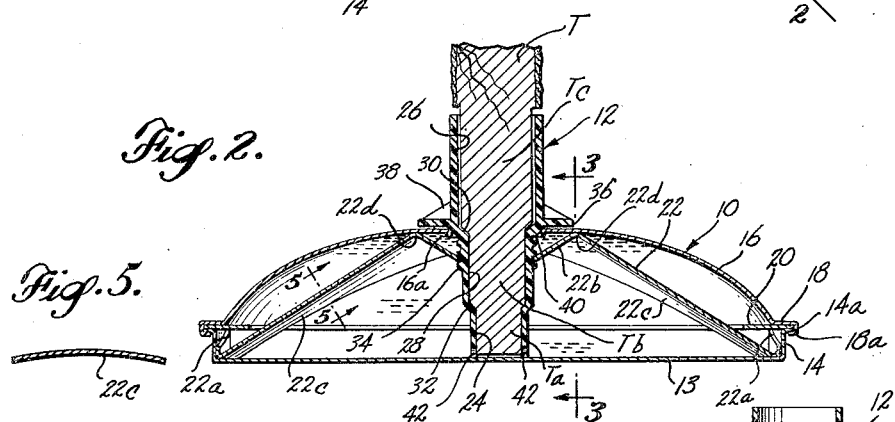
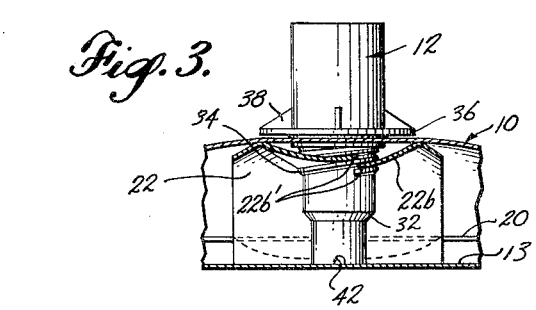
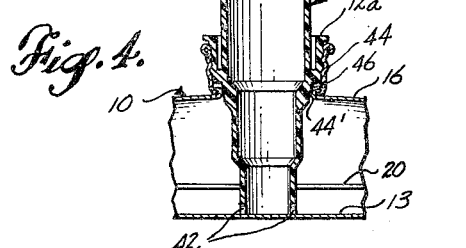
INVENTOR.
GORDON L. THORBURN
BY
Reynolds, Beach & Christensen
ATTORNEYS

United States Patent Office

3,038,688
Patented June 12, 1962

3,038,688
LIQUID CONTAINER TYPE CHRISTMAS
TREE STAND
Gordon L. Thorburn, Puyallup, Wash., assignor to G. R.
Kirk Company, Tacoma, Wash., a corporation
Filed Dec. 4, 1959, Ser. No. 857,320
8 Claims. (Cl. 248—44)

This invention relates to improvements in Christmas tree stands of the type incorporating or comprising a container for liquid in which the butt of the cut tree is immersed in order to prolong its useful life and impart other desired properties thereto. The invention is herein illustratively described by reference to the presently preferred form thereof; however, it will be recognized that certain modifications and changes therein with respect to details may be made without departing from the underlying and characterizing features involved.

In the background of this invention has been the desire and need to improve the techniques and means available for the processing and marketing of Christmas trees on a commercial scale. By keeping the cut tree butts immersed in water, particularly with certain chemical additives, it is possible to hold them in storage much longer than otherwise and to impart fire resistance, needle retentiveness and other desirable qualities for a relatively long period. By securing to the butt end of each tree a stand which is at the same time a container which is filled with preservative solution when the tree is being prepared for shipment to market it is possible to harvest, store, process, ship, market and use the trees with minimum handling and cost and with maximum results in terms of product quality.

Previous types of container stands for cut Christmas trees have been sufficiently successful to demonstrate the desirability and effectiveness of the general processing and marketing technique described. However, with former stands there has been room for considerable improvement in terms of manufacturing cost, of convenience in assembly of tree and stand, of attaining an effective lasting sealed joint between the tree and stand, of providing a practical means for replenishing the container liquid from time to time without lessening the effectiveness of the seal nor of the physical support for the tree through the joint, and, with all, of providing a simple low-cost stand of high strength and durability.

A general object of the present invention is to provide an improved container type stand and tree-stand combination which offers important improvements in each of the respects mentioned above and others related thereto.

More specifically an object of this invention is to provide a stand which provides an effective permanent seal and a lasting tight physical connection to the butt of the tree, yet which permits repeated interconnections and removals of the tree from the container base of the stand without impairing the effectiveness of the sealed connection. A related object is to attain these ends by a connection means which may be operated quickly and easily without wearing the tree butt where it enters the stand nor parts of the stand itself including the relatively light gauge sheet metal or other wall material in the container portion of the stand.

A further object is such a container stand which in its preferred form is easily manufactured and assembled, and may be produced inexpensively and attractively of formed sheet metal stampings, the lightness of the sheet metal or other material in the container walls not being a limitation on the physical strength and stiffness of the stand nor on the effectiveness of the liquid-tight seal provided. A further object is such an improved, practicable container type stand adapted to remain securely with the tree for preservative purposes even during shipment despite rough handling sometimes received by parcels of this type.

One feature of the invention resides in forming the completed stand with two separable parts, one the container base portion and the other an externally threaded sleeve portion which is press-fitted to the pre-sized butt end of the tree and may then be inserted, with the tree, into the container base through the neck of the latter and there secured, preferably by threading the same into a nut element of the container base. By providing in the stand a readily removable sleeve or tree-socket fitting it becomes an easy matter to establish initially a lasting force-fitted physical connection with the tree; also to add moisture or chemicals to the container without necessity of providing a separate covered inlet or of disturbing the effectiveness and tightness of the fit between socketing sleeve fitting and tree. Since the tree and the sleeve fitting can remain together throughout the useful life of the cut tree, the fit originally established between them can be made very tight for permanency.

In its preferred form a further important feature of the invention is the provision of a container base portion of relatively light-gauge metal having a central neck which preferably is beaded or flanged for stiffness, thereby to provide an evenly true seating rim or edge for a complemental surface on the threaded coupling sleeve, and a rim-supporting sleeve-engaging sheet metal "nut" of arched configuration. This nut element is adapted for threaded engagement by the sleeve fitting in order to draw the latter to a seat against the container neck for sealing purposes and at the same time functions as a container stiffener. The arched nut element has oppositely projecting ends extending into the peripheral recess defined between the container top and bottom and which are there provided with prongs dug into a clamped soft-material gasket for holding the nut firmly in position.

These and other features, objects and advantages of the invention will become more fully evident from the following description thereof by reference to the accompanying drawings.

FIGURE 1 is a top isometric view of the improved stand in its preferred form, parts being broken away to show details of construction.

FIGURE 2 is a transverse vertical sectional view taken on line 2—2 in FIGURE 1 and showing the butt end of a tree pre-sized and mounted in the stand.

FIGURE 3 is a fragmentary transverse sectional view taken on line 3—3 in FIGURE 2.

FIGURE 4 is a partial sectional view comparable to FIGURE 2 but illustrating a modification.

FIGURE 5 is a transverse sectional detail of the sheet metal nut, taken on line 5—5 in FIGURE 2.

Referring to the drawings, the container stand embodiment shown in FIGURES 1, 2 and 3, comprises the container base 10 and the tree-socketing sleeve fitting 12 removably threaded into the container base as previously mentioned. In its illustrated form the container base 10 is of light-gauge sheet metal. It comprises a flat circular bottom sheet 13 formed with a marginal upstanding or vertical flange 14 having an out-turned lip 14a. Marginally seamed to the lip 14a is the domed cover or top 16 which has an outwardly projecting flat horizontal marginal flange 18 provided with a down-turned lip 18a. The down-turned lip 18a is bent inwardly under the lip 14a in a seaming operation according to conventional techniques and by which a water-tight seal is effected between the marginally joined parts 13 and 16. Preferably a compressible or relatively soft (i.e., relative to the metal used in the container base) gasket 20 of annular form is interposed between the lip 14a and the flange 18 prior to the sealing operation and which not only improves the quality of the seal thus obtained but has another function which will be described. Conveniently this gasket is made of inexpensive cardboard.

The domed top 16 has a central circular aperture forming a neck or filler opening 16a the rim of which is stiffened by an edge bead or flange, turned inwardly of the container. The stiffened edge provides a true form against which a mating surface on the sleeve fitting 12 may be seated for sealing purposes, as will be described.

The container base 10 includes an additional element in the form of the sheet metal "nut" 22 which is generally of arched configuration and spans the internal breadth of the container proper. The nut has upturned outer ends which bear against the container bottom 13 and which form upwardly projecting sharp prongs 22a adapted to bite into the lower side of the cardboard gasket 20 directly beneath the top flange 18. The anchoring effect of these prongs holds the nut 22 against the torque of rotation accompanying threaded insertion and removal of the sleeve fitting 12, and generally holds the nut in proper centered position in the container. Preferably the arched nut 22 has a central depression or cavity portion designated 22b with a central aperture therein whose rim or edge has been slit radially at diametrically opposite points and has been formed (as at 22b') to engage a screw thread on the sleeve fitting to be described. To this end the slit edges are offset from each other parallel to the vertical axis of the stand, the relative offset of the two pairs of slit edges being opposite, and the intervening portions of the aperture edge being helically curved to interconnect the slit edges. This method of forming a screw thread element in a sheet metal nut generally is in itself well known as a practical device. For purposes of stiffness the oppositely directed arms 22c of the arched nut 22 are curved transversely to their length as indicated in FIGURE 5.

At their inner, upper ends where the arms merge with the annular crest of the arched nut adjoining the conically formed depression 22b, the nut preferably makes contact with the underside of the top 16. This support for the top 16 applied close to the sealing rim or neck 16a stiffens the light-gauge top to resist the downward pressure exerted by the sleeve fitting 12 when seated against it.

Turning now to the preferred form of the tree-socketing sleeve fitting 12, it will be observed that this fitting comprises an elongated tubular form, the interior surface of which is stepped in diameter along its length including a lower portion 24 of smallest diameter, an upper portion 26 of largest diameter, and an intermediate, connecting portion 28 of intermediate diameter. Preferably the three portions are interconnected by inwardly sloping shoulders 30 and 32, so as to facilitate insertion of the butt of the tree into this tubular form with minimum likelihood of the edges catching or lodging on the shoulders.

In order to conserve material and facilitate insertion through the opening 16a, the exterior of the elongated tubular sleeve form is also preferably tapered downwardly or graduated in diameter so as to maintain an approximately uniform wall thickness throughout its length. The intermediate section thereof has external screw threads 34 which are adapted to engage the screw thread formation on the sheet metal nut 22 when the sleeve fitting is advanced downwardly through the neck of the container and into the central opening in the nut 22. Such engagement is, of course, effected by rotation of the sleeve fitting 22 in the proper direction, depending upon the hand or direction of the threads. In order to facilitate turning of the sleeve fitting to tighten and loosen the threads, the sleeve is provided with a projecting flange 36 and with reinforcing webs or gussets 38 in the corner defined between the flange and the upper portion of the sleeve. These gussets stiffen the flange and provide convenient finger grips.

In order to assure a liquid-tight seal of the sleeve fitting 12 with the container base top 16 at the neck 16a, the sleeve fitting has a sloping shoulder 40 extending around its periphery generally between the flange 36 and the upper end of the screw threads 34, which shoulder converges downwardly and is adapted to seal against the neck of the container top by a wedging action. Slight compressibility of the plastic sleeve fitting material makes possible a liquid-tight seal without use of an intervening gasket.

Preferably the length of the sleeve fitting 12 beneath the seating shoulder 40 thereof is such that the bottom end of the sleeve fitting contacts the container bottom 13, thereby to add further to the load capacity of the stand as a result of mutual interengagement of parts. Side openings or ports 42 in the lower edge of the sleeve fitting permit ingress of liquid to the cut tree butt T.

Preferably the sleeve fitting 12 is formed of a suitable plastic material such as a high impact styrene, which is relatively inexpensive and readily molded by an injection process, although other suitable materials, plastic or otherwise, may be used for the purpose. Strength is important, however, inasmuch as it is desired to employ a force fit between an internal surface of the sleeve fittting and the tree butt.

In order to fit the sleeve 12 in the intended manner, the butt end of the tree T is turned or doweled so as to form a lower end portion Ta which will have a force or press fit with the sleeve portion 24, and an intermediate portion Tb which will have a sliding fit with the intermediate sleeve portion 28, and an upper portion Tc which will have a loose fit with the upper sleeve portion 26. Once additional moisture is absorbed by the tree butt when in the stand the fit will be even tighter. The three-step graduation in diameter of the tree (and sleeve fitting) is preferred to a two-step graduation because of the more effective and permanently tight securement which it affords. If the tree tends to flex or sway laterally, the surrounding upper wall portion 26 limits the flexure of the butt portion within the fitting 12 at the upper edge of the fitting without disturbing or producing relative motion between the lower press-fitted surfaces of the fitting and tree. Moreover, since the press-fit surface area is less when the tree butt is reduced in diameter at the tip, less total force is required than otherwise in order to apply the sleeve fitting 12 to the tree butt. The reduction of butt diameter in stages or steps to the smaller tip or end Ta weakens the tree butt less at the joint than if it were reduced to the smaller diameter over its full socketed length.

Once the sleeve fitting is driven onto the tree butt by force, which may be accomplished by a mallet, a press or otherwise, it preferably remains with the tree.

As to material, it has already been stated that it is preferred to manufacture the container base top 16 and bottom 13 of light gauge sheet metal. This is cold rolled steel sheeting suitably painted, lacquered or otherwise treated for moisture and corrosion resistance, whereas the nut 22 is preferably of the same material but of somewhat thicker gauge for strength. It is also lacquered or otherwise protectively coated against deterioration.

If desired, the parts of the container base top and bottom may be seamed together with the sleeve fitting 12 inserted firmly in place in relation to the top 16 and nut 22 in order to hold the nut in place. Alternatively other means may be used to position the nut during the seaming operation.

In the modification shown in FIGURE 4, the reinforcing stiffener nut 22, representing an important feature of the preferred embodiment thus far described, is eliminated and is replaced by a nut 44 conveniently made in the form of a conventional bottle cap or can spout cap of the threaded type, but in this case having a central aperture, the rim of which is seamed as at 44' to the bead or lip at the neck of the container base cover 16 as shown. Without the stiffener 22 the sheet metal top of the container in this case is preferably of somewhat heavier gauge metal in order to achieve comparable strength to that in the first embodiment. The sleeve fitting 12' in this case has a coaxial flange portion 12'a which is externally threaded and is adapted to engage the threads of the nut 44. The seamed edge 44' provides a sealing edge against which a suitable sloping shoulder surface 46 on the exterior of the sleeve fitting 12' engages in order to form a tight seal. The sleeve fitting 12' in other respects is or may be the same as or generally similar to that shown in the preceding embodiment, although in this case the provision of an external flange 36 is shown omitted. The container base 10 is or may be, in other respects, generally similar to that shown in the preceding embodiment.

These and other aspects of the invention will be recognized by those skilled in the art on the basis of the foregoing description of illustrative embodiments thereof.

I claim as my invention:

1. A liquid container type Christmas tree stand comprising a container base including interconnected top and bottom walls comprising an enclosure adapted to contain liquid, said top wall having a central aperture therein for introduction of liquid, said container base further including connector means connected to the enclosure in substantially fixed relation to the top wall and having a central opening in registry with said aperture, and a socket fitting comprising an elongated sleeve member adapted to receive and hold the butt end of a cut tree pressed endwise into the same, said sleeve member having a lower end portion removably inserted downwardly into said enclosure through the aligned aperture and opening, thereby to plug said enclosure with a tree socketed in said fitting, said socket fitting having a connector element adapted for readily detachable engagement with said connector means with the sleeve thus inserted to a predetermined depth in the enclosure, and mutually cooperable sealing means comprising portions respectively of the container base and socket fitting, and cooperatively interengageable, to effectuate a seal between the container base enclosure and the inserted socket fitting by interengagement of the connector element and connector means, said sleeve member having an interior wall which includes a lower cylindrical end portion of relatively small diameter, an upper cylindrical end portion of relatively large diameter, and an intermediate portion including at least one transitional step in diameter therebetween, said connector means comprising a nut member generally of arched form fixedly mounted within the enclosure and having screw-thread engaging means at the opening therein, spaced below the top wall, said nut member having oppositely projecting end portions which extend laterally to opposite sides of the enclosure, said connector means further including retainer means engaging such end portions and fixing said nut element to the container base against relative movement therein, wherein the socket means connector element comprises a screw-threaded exterior portion on the sleeve member, interengageable with said nut member screw-thread engaging means, and wherein the sealing means portion of the container base comprises the aperture rim while the sealing means portion of the socket fitting comprises an exterior annular shoulder adapted to be drawn against such rim by progressive engagement of said screw-threaded connector element.

2. The stand defined in claim 1, wherein the nut member is formed of sheet metal and its opposite end portions extend into contact with the bottom wall and are upturned therefrom as prongs, and the retainer means comprises a gasket fixedly secured within the enclosure against the top wall and contacted by the prongs to press the gasket against the top wall.

3. The stand defined in claim 2, wherein the screw-thread engaging means of the sheet metal nut member comprises the edge of the opening therein, slitted and formed to engage screw threads, and the nut member includes a depressed portion within which the opening is formed and which rises laterally outwardly therefrom to an annular crest which abuts against the lower side of the top wall adjacently surrounding the aperture therein.

4. A liquid container type Christmas tree stand comprising a container base including interconnected top and bottom walls comprising an enclosure adapted to contain liquid, said top wall having a central aperture therein for introduction of liquid, said container base further including connector means connected to the enclosure in substantially fixed relation to the top wall and having a central opening in registry with said aperture, and a socket fitting comprising an elongated sleeve member adapted to receive and hold the butt end of a cut tree pressed endwise into the same, said sleeve member having a lower end portion removably inserted downwardly into said enclosure through the aligned aperture and opening, thereby to plug said enclosure with a tree thus socketed in said fittting, and mutually cooperable sealing means comprising portions respectively of the container base and socket fitting, and cooperatively interengageable, to effectuate a seal between the container base enclosure and the inserted socket fitting, said connector means comprising a nut member fixed against rotation within the enclosure, having an upper portion adjacent the top wall of the enclosure and having said central opening therein aligned with said aperture, said sleeve member and nut member opening comprising cooperable screw-thread elements interengaged to maintain the socket fitting tightly but removably inserted in the enclosure.

5. The tree stand defined in cliam 4, wherein the nut member comprises an arched sheet metal strip with its upper portion having an annular shoulder abutted against the top wall of the enclosure and having opposite end portions extending downwardly and outwardly into engagement with the enclosure at the lower portion of the latter.

6. A liquid container type Christmas tree stand comprising a base including a liquid container of light-gauge sheet material having a top with a central opening therein, a relatively heavy-gauge sheet material nut member inside said container and of arched form having supporting leg portions spanning outwardly and downwardly into anti-rotational engagement with the lower portion of the container, said nut member having a central opening therein defining a first screw-thread element, and a tree-socket fitting comprising a sleeve adapted to be pressed over the butt end of a cut tree to retain the tree therein and having a lower portion removably inserted into said container opening, and interengageable complementally formed annular sealing elements on the container and on the fittting, said fitting further comprising a second screw-thread element complemental to the first-mentioned screw-thread element and engageable therewith by relative rotation between the sleeve and the base with the sleeve so inserted, thereby to advance the sealing surfaces into contact with each other.

7. A liquid container type Christmas tree stand comprising a base including a liquid container of light-gauge sheet material having a top wall with a central opening therein and a first annular sealing element at said opening, a relatively heavy-gauge tree support within said container, having downwardly and outwardly extending leg portions engaging the container, and an intermediate upper portion having a central aperture defining a first screw-thread element, and a tree-socket fitting comprising a sleeve adapted to be pressed over the butt end of a cut tree to retain the tree therein, said fitting being removably inserted into said container through said openings and having a second screw-thread element engageable with the first screw-thread element to maintain the fitting so inserted, said fitting having a downwardly projecting lower portion substantially contacting the container bottom and having a second annular sealing element cooperatively engaging said first sealing element to form a liquid-tight seal therebetween.

8. A liquid container type Christmas tree stand comprising a base including a liquid container having a top wall with a central opening therein and a first annular sealing element at said opening, said container further comprising a screw-thread member having a central aperture therein, and a tree-socket fitting comprising a sleeve adapted to be pressed over the butt end of a cut tree to retain the tree therein, said fitting being removably inserted into said container through said opening and aperture and having a second screw-thread element engageable with said screw-thread member to maintain the fitting so inserted, said fitting having a downwardly projecting lower portion substantially contacting the container bottom and having a second annular sealing element cooperatively engaging said first sealing element to form a liquid-tight seal therebetween.

References Cited in the file of this patent

UNITED STATES PATENTS

| | | |
|---|---|---|
| 1,855,762 | Kaminski | Apr. 26, 1932 |
| 2,317,049 | Ginka | Apr. 20, 1943 |
| 2,908,108 | Brutting | Oct. 13, 1959 |
| 2,928,633 | Holmes et al. | Mar. 15, 1960 |

FOREIGN PATENTS

| | | |
|---|---|---|
| 25,115 | Norway | Oct. 12, 1914 |